United States Patent [19]

Minnick et al.

[11] 3,785,840

[45] Jan. 15, 1974

[54] LIME-FLY ASH-SULFITE MIXTURES

[75] Inventors: Leonard John Minnick, Cheltenham; William C. Webster, Norristown; Charles L. Smith, Conshohocken, all of Pa.

[73] Assignee: G & W. H. Corson, Inc., Plymouth Meeting, Pa.

[22] Filed: June 5, 1972

[21] Appl. No.: 259,461

[52] U.S. Cl............. 106/118, 106/121, 106/DIG. 1
[51] Int. Cl................................................ C04b 7/34
[58] Field of Search.................. 106/118, 120, 105, 106/DIG. 1, 121; 423/244

[56] References Cited
UNITED STATES PATENTS

| | | | |
|---|---|---|---|
| 1,942,770 | 1/1934 | Peffer et al. | 106/119 |
| 2,564,690 | 8/1951 | Havelin et al. | 106/120 |
| 3,076,717 | 2/1963 | Minnick | 106/118 |
| 3,230,103 | 1/1966 | Minnick | 106/118 |
| 3,642,445 | 2/1972 | Muter et al. | 106/288 B |

*Primary Examiner*—James E. Poer
*Attorney*—Austin R. Miller and Paul F. Prestia

[57] ABSTRACT

A hardenable cementitious mixture comprised of lime, fly ash, and sulfite salts in predetermined portions may be produced from a combination of the fly ash product from combustion equipment and the slurry produced in scrubbing stack gases from such equipment to remove sulfur oxides therefrom. Generally, the cementitious mixture comprises a water solids mixture with about 30 – 90 weight percent solids. Further, the solids comprise 0.25 – 70 percent by weight alkaline earth metal hydroxide, 10 – 99.5 weight percent fly ash, and 0.25 – 70 percent by weight of alkaline earth metal sulfite of which some portion thereof may be replaced by alkaline earth metal sulfates.

This cementitious mixture may be used either by itself or with a filler or aggregate material.

6 Claims, No Drawings

LIME-FLY ASH-SULFITE MIXTURES

This invention relates to a novel cementitious composition which may include as an essential ingredient thereof waste products from combustion equipment, such as coal burning power generating stations. The waste products thus utilized in making the composition of the present invention include fly ash and sludge produced in wet scrubbing of stack gases to remove sulfur oxides therefrom.

With the developing interest in protecting the world's environment, intense efforts have been directed to removing the pollutants from various industrial sources, such as the flue gases of combustion equipment, the most notable examples of which are coal burning power generating stations.

One product of such equipment, particularly coal burning equipment, is the finely divided particulate material known as fly ash, which is usually removed from stack gases by electrostatic precipitators. The chemical reactivity, and particularly the pozzolanic activity of fly ash, is well known and the combination of such fly ash with lime to produce cementitious compositions is also well known. This provides a useful means for disposing of such fly ash, which would otherwise be considered a waste product.

In the past few years it has been found that an improved lime-fly ash reaction can be obtained by the incorporation therein of sulfate materials or by the utilization of sulfate-containing waste sludges. One of the hardened reaction products of this cementitious mixture is a crystalline material known as "ettringite."

Notwithstanding the prior art knowledge of the lime-fly ash reaction and the lime-fly ash-sulfate reaction and the useful outlet for "waste" materials which cementitious mixtures based thereon provide, there remains the need to dispose of still another waste material from combustion equipment stack gases in a useful manner. This material is the sludge produced in the wet scrubbing sulfur oxide removal technique wherein combustion equipment stack gases are scrubbed with water and either the hydrate or carbonate form of an alkaline earth metal. If the former is used, the sludge contains alkaline earth metal sulfite and excess alkaline earth metal hydroxide. If the latter is used, alkaline earth metal carbonates and sulfites are present.

Generally, equipment for wet scrubbing of stack gases for sulfur oxide removal may take various forms but these particular forms are currently in the advanced developmental stage, one using hydrated lime, one using pulverized limestone, and the other using magnesium oxide or hydroxide. In each case, the liming agent is fed through the boiler gas scrubbing operation as a slurry capturing sulfur oxides from the boiler gases and converting them mainly to calcium sulfite hydrate. Some of these scrubbing systems also simultaneously trap fly ash, while in others nearly all the fly ash is removed by electrostatic precipitators before the gases reach the scrubber.

The term "hydrated lime" as used throughout this specification refers to calcium hydroxide (hydrated high calcium quicklime) or a mixture of calcium hydroxide and either magnesium oxide (dolomitic monohydrate) or magnesium hydroxide (dolomitic dihydrate). Similarly, "limestone" refers to naturally occurring limestone, or dolomite generally consisting of calcium carbonate or a mixture of calcium carbonate and magnesium carbonate.

The product of the aforementioned wet scrubbers is best described as a sludge-like mass which may contain about 70 percent solids after treatment for dewatering the typical solid content prior to dewatering being on the order of 9 percent, see "typical example" hereinafter. These sludge solids are generally calcium sulfite, plus some quantities of calcium sulfate caused by oxidation, plus fly ash, plus excess liming agent. It should be noted that all existing desulfurization systems have a degree of inefficiency such that a greater than stoichiometric dosage of liming agent is required.

Boiler exhaust gases typically contain small amounts of sulfur trioxide along with relatively large quantities of sulfur dioxide. The trioxide form is believed to result from oxidation of the dioxide within the boiler; in a scrubbing function of the type described herein calcium sulfate is formed from the trioxide. Additionally, oxygen in the scrubber slurry can oxidize significant amounts of calcium sulfite to calcium sulfate. A comparable situation exists for magnesium compounds. Depending on boiler and scrubber conditions, the sulfite-sulfate ratio may vary considerably.

It is the primary object of the present invention to provide a novel and useful cementitious composition, one of the components of which is alkaline earth metal sulfite waste sludge.

Another object of this invention is to provide such a composition, also incorporating therein a second waste material, namely, fly ash.

A still further objective of the present invention is to provide a composition for forming a hardenable mass which may be used as non-polluting structural fill, or in structural shapes, such as aggregate or brick, or as roadbase compositions. In utilizing such sludges, the hardenable composition may be used alone or it may be used in conjunction with soil, conventional aggregate materials or other fill materials.

Briefly, the present invention comprises a cementitious composition consisting of a water-solids mixture with from about 30 – 90 weight percent solids, depending on the desirability of supernatant water and whether the ultimate use involves pumping the mixture or handling it in some other manner. The solids content of this mixture comprises 0.25 – 70 weight percent of alkaline earth metal hydroxide, 10 – 99.5 weight percent fly ash, and 0.25 – 70 weight percent alkaline earth metal sulfites, of which some of the sulfite constituents may be replaced by alkaline earth metal surfates.

To the extent that the amount of sludge and fly ash produced in a specific piece of combustion equipment does not fall within the foregoing ranges, lime, flyash, and sulfites may be added to bring the sludge-fly ash mixture into compositional compliance with the limits in order to produce the cementitious mixture of this invention.

Generally, the solids content should be between 30 and 60 percent if supernatant water is desired and between 50 and 80 percent if no supernatant water is desired. Further increases in solids content will generally result in non-pumpable mixtures. The exact solids content required for a given application will vary with the physical characteristics of the sludge and fly ash used, the degree of flowability desired, the rate of hardening desired, etc.

The cementitious composition of the present invention may of course be combined with numerous other materials. For example, it may be combined with soil in making a hardenable roadbase. Similarly, it may be combined with filler material or conventional aggregate materials, which may serve as reinforcement for better strength or as volume-increasing agents.

Lime-fly ash and lime-fly ash sulfates may also be combined with or incorporated in the cementitious mixture of this invention. To the extent sulfates are present, of course, they will react to form an ettringite product. As pointed out above, substantial quantities of sulfates are often present in scrubber slurries due to the oxidation of either sulfites or sulfur dioxide. This in no way impairs the usefulness of the slurry in accordance with the present invention since the reaction upon which it depends may occur so long as there is any significant amount of sulfite present. Practically speaking, it is thought that a sulfite content of less than 10 percent of the total sulfite plus sulfate content may be considered insignificant insofar as the present invention is concerned. Below that level, the amount of sulfite present would not be expected to contribute noticeably to the cementitious reaction.

A typical example of how the composition of the present invention may be made from a limestone scrubber slurry is as follows:

Exhaust gases from a pulverized coal burning power station are fed through a venturi gas scrubbing system. Also feeding into this scrubbing system is a slurry of approximately 3.5 percent (by weight) of finely pulverized limestone ($CaCO_3$) in water. The sulfur oxide gases produced during the combustion of the pulverized coal are chemically captured by the limestone slurry. The product of this reaction has a calcium sulfite to calcium sulfate ratio of 1:1. In addition, the fly ash being carried by the boiler exhaust gases is physically captured in the liquid flow. The scrubber output slurry having a composition of 91.0% $H_2O$
2.9% $CaSO_3 \cdot \frac{1}{2} H_2O + CaSO_4 \cdot 2 H_2O$
1.4% Unreacted limestone ($CaCO_3$)
4.7% Fly Ash is fed into a thickener which increases the solids content to approximately 50 percent. The thickener output is fed to a vacuum drum filter wherein the solids content is further increased to approximately 74 percent solids. The filter cake produced by the vacuum filter is dropped onto a conveyor belt leading to a dryer, for example a thermal disc type dryer. A hopper and vibratory feeder discharge lime onto this belt so that the thermal disc dryer acts as a mixing device as well as a dryer. The product of thermal disc drying, having approximately an 80 percent solids, has been adjusted by the addition of hydrated lime to produce the following composition:

20% Water
25% $CaSO_3 \cdot \frac{1}{2} H_2O + CaSO_4 \cdot 2 H_2O$
12% Unreacted Limestone ($CaCO_3$)
40% Fly Ash
3% Hydrated Lime ($Ca(OH)_2$)

This mass is conveyed to a landfill site using ordinary dump trucks. The composition is simply dumped, requiring no compaction, and gradually becomes impermeable and monolithic in nature.

In a similar situation where trucking of the scrubber sludge to the landfill site is not feasible, the thickener output is supplemented with 3 percent dolomitic monohydrated lime added to a mixing screw, then is pumped to the site utilizing a diaphragm type slurry pump. The quantity of supernatant liquid (which comes to the top of the sludge) is repumped and utilized as water in the limestone slurry make-up. While this composition is chemically similar to that mentioned above, the presence of a greater water content yields a development of strength and impermeability that is less rapid.

In either case a chemical reaction would occur utilizing the three major components of the composition to develop reaction products which lend strength and impermeability to the mass. The degree of strength and impermeability is, of course, dependent upon composition of the mass.

The cementitious composition may also be used to produce a self-hardening, relatively lightweight synthetic aggregate for general use.

In a typical illustration showing how the cementitious composition of the present invention may be used for production of a synthetic aggregate, the sludge made from scrubbing (with limestone) the exhaust gases of a pulverized coal burning power station in a venturi gas scrubber is dewatered by use of clarifiers and vacuum filters; the following composition results:

Pulverized High Calcium Limestone — 20%
Calcium Sulfite Hemi-Hydrate — 20%
Calcium Sulfate Dihydrate — 20%
Bituminous Coal Fly Ash — 20%
Water — 20%

To this mass is added 5 percent (based on total weight of starting composition) High Calcium Hydrated Lime, an additional 20 percent fly ash (dry) and sufficient water to achieve a water content of 16 percent (water is added in this case for extrudability; under ordinary circumstances no addition of water is necessary). This mixture is blended in a Muller type mixer to achieve uniform composition and then fed into a roll type pelletizer (of the type disclosed in U.S. Pat. No. 3,561,050), a pelletizing pan, or other forming device which typically produces aggregate pieces, approximately three-eighths inch square in cross section and three-fourths inch to 1¼ inches in length.

The pelletizer output may be stockpiled for a period of time (dependent upon weather conditions) until it achieves a sufficient hardness to be used as aggregate in stabilized base materials, asphaltic concrete, etc.

In an illustration of possible use of the lime-fly ash-sulfite cementitious mixture as a roadbase composition, a blend is made consisting of 1.3 percent high calcium hydrated lime, 1.3 percent high calcium sulfite sludge, 10.4 percent bituminous fly ash and 87.0 percent graded dolomitic aggregate. The sulfite sludge consists principally of calcium sulfite hemi-hydrate with a limited quantity of calcium sulfate dihydrate and unreacted high calcium limestone.

The aggregate can be any common mineral aggregate or, equally as well, the synthetic aggregate made in accordance with present invention as described in the illustrative example. Typical aggregate gradation is % thru three-fourths inch sieve — 90%
% through three-eighths inch sieve — 60%
% thru No. 4 sieve — 42%
% thru No. 8 sieve — 32%
% thru No. 30 sieve — 16%
% thru No. 50 sieve — 10%
% thru No. 100 sieve — 8%

Fineness Modulus — 5.2

The components as described above are blended in a typical base course blending plant wherein measured amounts of the components are fed from storage hoppers or tanks onto a conveyor belt which carries the materials to a pugmill; here the required water is added and thorough mixing occurs. The composition, in a damp compactable state (approximately 8 percent water), is moved by dump truck to the job site. Here the compositions are spread and compacted by use of steel-wheel rollers to a 5 inches depth. This base course is later topped by a bituminous wearing course. The base, in a reasonable period of time, develops strengths approaching 1000 lbs. per sq. inch unconfined compressive strength, and is highly resistant to dimensional changes due to wetting and drying or degradation caused by freeze/thaw cycles.

The foregoing are illustrative examples, based on laboratory experiments, of how the present invention would be used in practical applications. Following are a number of more specific examples of the present invention.

EXAMPLE 1

In one test of the present invention a synthetic sulfite sludge was formed by mixing 50 lbs. of dolomitic monohydrated lime with water in a 55 gallon drum and passing sulfur dioxide gas through the suspension until the alkaline earth metals in the lime had completely converted to calcium and magnesium sulfites. The calcium formed insoluble calcium sulfite while the magnesium formed soluble magnesium bisulfite. After the completion of the reaction the slurry was permitted to settle for 24 hrs. after which the supernatant was removed. This, in effect, removed a large quantity of the magnesium bisulfite from the slurry. The sludge remaining in the drum was dried and pulverized. Several compositions were prepared in which the dried sulfite material was mixed with varying quantities of a typical bituminous fly ash; dolomitic monohydrated lime was added where necessary to adjust the pH of these compositions to 11 and water was added to achieve a compactable consistency. The damp compositions were then pressed in a laboratory Carver press to form 1⅛ inch diameter cylinders. These were cured at either 73°F or 100°F for the time specified in the following table, then broken in unconfined compression. Table 1 indicates the strength of these specimens in lbs./sq. inch.

EXAMPLE 2

A number of compositions were prepared using an N–50 Hobart mixer. The compositions were prepared at a damp consistency and were extruded using a laboratory auger type IBM extruder. The individual pieces so prepared were moist cured at either 70°F or 100°F for specified periods of time, after which the pellet breaking strength was measured by the total pounds force required on a one-fourth inch steel bar.

The materials used in the test series were either dolomitic monohydrated lime or high calcium hydrated lime, a typical bituminous fly ash, and sulfite sludges; the sludges were manufactured in the laboratory by bubbling $SO_2$ gas through lime slurries, and were either of the dolomitic or high calcium type. In order to achieve acceptable moisture contents in the overall mixtures the sludges were allowed to settle for a period of time after which they were decanted. Superiority of the sludge containing mixes was evident as indicated in Table 2.

TABLE 1

| Composition (Dry Basis) | | | | Compressive Strength | | |
|---|---|---|---|---|---|---|
| Sulfite Sludge (%) | Dolomitic Monohydrated Lime (%) | Fly Ash (%) | Curing Temperature °F | 7 days (psi) | 14 days (psi) | 28 days (psi) |
| 9.7 | 3.4 | 86.9 | 73 | 105 | 180 | 180 |
|  |  |  | 100 | 225 | 270 | 300 |
| 18.7 | 6.5 | 74.8 | 73 | 120* | 225* | 490* |
|  |  |  | 100 | 305* | 595* | 750* |
| 27.1 | 9.5 | 63.4 | 73 | 115* | 210* | 625* |
|  |  |  | 100 | 250* | 655* | 900* |
| 35.0 | 12.6 | 52.4 | 73 | 115 | 190 | 620 |
|  |  |  | 100 | 185 | 770 | 940 |

* Average of Two Tests

TABLE 2

| Mix Composition | | | | Pellet Strength (lb), 100°F | | | Pellet Strength (lb), 70°F | | |
|---|---|---|---|---|---|---|---|---|---|
| % Dolomitic Mono-Hydrated Lime | High Calcium Hydrated Lime | % Sludge (dry weight) | % Fly Ash | 1 Wk. | 2 Wk. | 4 Wks. | 1 Wk. | 2 Wk. | 4 Wks. |
| Dolomitic Sludge | | | | | | | | | |
| 10 | 0 | 10 | 80 | 60 | 81 | 76 | 32 | 52 | 67 |
| 10 | 0 | 20 | 70 | 114 | 134 | 119 | 12 | 73 | 113 |
| High Calcium Sludge | | | | | | | | | |
| 10 | 0 | 10 | 80 | 63 | 79 | 83 | 37 | 64 | 67 |
| 10 | 0 | 20 | 70 | 91 | 142 | 164 | 17 | 67 | 122 |
| 0 | 10 | 20 | 70 | 122 | 123 | 155 | 44 | 81 | 127 |
| Reference Mix | | | | | | | | | |
| 10 | 0 | 0 | 90 | 58 | 64 | 72 | 0 | 17 | 44 |

To differentiate between the sulfite sludge reaction and other lime/fly ash type reactions, three of the preceding compositions were examined by x-ray diffraction analysis to determine the utilization of components and products of the reaction. The following table, Table 3, gives semi-quantitative values (counts per second) of the crystalline components and products.

TABLE 3

| 10% Dolomitic Monohydrated Lime 90% Fly Ash | | | | |
|---|---|---|---|---|
| | Immediate | 1 Week | 2 Weeks | 4 Weeks |
| $Ca(OH)_2$ | 28 cps | 16 cps | 14 cps | * cps |
| $CaSO_4 \cdot 2H_2O$ | * | * | * | * |
| Ettringite | * | * | 10 | 14 |

| 10% Dolomitic Monohydrated Lime 20% Dolomitic Sulfite Sludge 70% Fly Ash | | | | |
|---|---|---|---|---|
| | Immediate | 1 Week | 2 Weeks | 4 Weeks |
| $Ca(OH)_2$ | 27 cps | * cps | * cps | * cps |
| $CaSO_3 \cdot \frac{1}{2}H_2O$ | 60 | 58 | 65 | 66 |
| $CaSO_4 \cdot 2H_2O$ | * | * | * | * |
| Ettringite | * | * | * | * |

| 10% Dolomitic Monohydrated Lime 10% Dolomitic Sulfite Sludge 80% Fly Ash | | | | |
|---|---|---|---|---|
| | Immediate | 1 Week | 2 Weeks | 4 Weeks |
| $Ca(OH)_2$ | 27 cps | * cps | * cps | * cps |
| $CaSO_3 \cdot \frac{1}{2}H_2O$ | 32 | 30 | 37 | 27 |
| $CaSO_4 \cdot 2H_2O$ | * | * | * | * |
| Ettringite | * | * | * | * |

\* None discernable (below threshold value)

These data demonstrate that the sulfite reaction is not simply an oxidation to the sulfate with subsequent formation of ettringite, since it is noted that the calcium sulfite hemihydrate does not diminish during the curing. The calcium hydroxide, however, does diminish — and is completely consumed in each of the mixes investigated. Since the compositions do develop considerable strength, it is obvious that calcium hydroxide (the only crystalline component to diminish in quantity) is reacting with a non-crystalline component, most likely amorphous silica from the fly ash. The most important point of the example is that the presence of the calcium sulfite hemihydrate accelerates the utilization of the calcium hydroxide, as is evident from both the X-ray diffraction and strength data.

EXAMPLE 3

Specimens were prepared and tested for compressive strength utilizing samples of typical high calcium hydrated lime, bituminous fly ash, and dolomite aggregate in conjunction with a laboratory generated calcium sulfite sludge.

The calcium sulfite sludge was prepared by bubbling sulfur dioxide gas through a 14 weight percent high calcium hydrated lime/water slurry; the resulting calcium sulfite sludge contained 31 percent solids (at pH 7.2).

The specimens — cylinders 4 inches in diameter, 4.5 inches in height — were prepared as delineated in American Society for Testing and Materials Specification C–593, (Specification for Fly Ash and Other Pozzolans for Use with Lime) Section 8 — Nonplastic Mixtures.

Curing was in sealed containers for seven days at either 75° or 100°F. The materials used and results attained are set forth in detail in Table 4.

TABLE 4A

| Gradation of Aggregate Used | |
|---|---|
| % thru ¾" sieve | 79 |
| % thru ⅜" sieve | 46 |
| % thru No. 4 sieve | 29 |
| % thru No. 16 sieve | 15 |
| % thru No. 100 sieve | 7 |

TABLE 4B

Test Mixes

| | Mix Composition | | |
|---|---|---|---|
| Mix Designation | %Lime + Sulfite | % Fly Ash | % Aggregate |
| 1 | 3.90 | 9.10 | 87.00 |
| 2 | 2.60 | 10.40 | 87.00 |
| 3 | 1.30 | 11.70 | 87.00 |
| 4 | 0.65 | 12.35 | 87.00 |

TABLE 4C

Compressive Strength Tests

| Mix Designation | %Fly Ash In Cementitious Portion | Lime: Sulfite Ratio | | |
|---|---|---|---|---|
| | | 4:1 | 1:1 | 1:4 |
| Compressive Strength (7 days at 75°F) | | | | |
| 1 | 70 | 92 psi | 104 psi | 117 psi |
| 2 | 80 | 149 psi | 165 psi | 171 psi |
| 3 | 90 | 161 psi | 147 psi | 159 psi |
| 4 | 95 | 217 psi | 195 psi | 218 psi |
| Compressive Strength (7 days at 100°F) | | | | |
| 1 | 70 | 440 psi | 695 psi | 518 psi |
| 2 | 80 | 781 psi | 697 psi | 623 psi |
| 3 | 90 | 784 psi | 833 psi | 423 psi |
| 4 | 95 | 509 psi | 486 psi | 354 psi |

EXAMPLE 3A

A quantity of calcium sulfite sludge was prepared as in preceding examples by bubbling $SO_2$ through a high calcium hydrated lime (calcium hydroxide) slurry. Six portions of the slurry were blended with varying percentages of dry high calcium hydrated lime in order to achieve weight ratios of hydrated lime to calcium sulfite of 1:0, 4:1, 2:1, 1:1, 1:2, 1:4, and 1:9. Each of the lime-sulfite sludges so produced was mixed with varying percentages of fly ash. All compositions were adjusted to a specific range of consistency by the addition of water where required. The American Society for Testing and Materials C–230 procedure was used for consistency measurements; all flows were held between 120 and 140 percent.

The compositions were placed in 6 inches lengths of 2 inches diameter stainless steel tubing, capped at the bottom end with nylon cloth held in place with a rubber band. Two tubes were prepared from each composition; one complete set (one tube of each composition) was cured at 70°F with the tube bottom immersed in 1 inch of deionized water in an aquarium, the second set being cured in a similar manner at 100°F.

After one week of curing the specimens were tested for resistance to penetration. The apparatus used for this test has an upper limit of 8,000 lbs/sq. in. The results were as set forth in Table 5.

varying percentages of fly ash. All compositions were adjusted to an equal consistency by the addition of water; consistency was measured by the standard American Society for Testing and Materials C-230 procedure, and all flows were held between 120 and 140 percent. The dry weight percentages used are given in the following table.

The compositions prepared in this manner were placed in 6 inch lengths of 2 inches diameter stainless steel tubing, capped at the bottom end with nylon cloth held in place with a rubber band. Two tubes were prepared from each composition. One complete set (1 tube of each composition) was cured at 70°F with the tube bottom immersed in 1 inch of deionized water in Table 5 – Penetration resistance of high calcium – hydrated lime – sulfite-fly ash compositions

| Percent Fly ash in mix | Hydrated lime/sulfite ratio | | | | | | | Hydrated lime/sulfite ratio | | | | | | |
|---|---|---|---|---|---|---|---|---|---|---|---|---|---|---|
| | 1:0 | 4:1 | 2:1 | 1:1 | 1:2 | 1:4 | 1:9 | 1:0 | 4:1 | 2:1 | 1:1 | 1:2 | 1:4 | 1:9 |
| | 1 Week – 70°F | | | | | | | 1 Week – 100°F | | | | | | |
| 100 | 2400 | 2400 | 2400 | 2400 | 2400 | 2400 | 2400 | 4400 | 4400 | 4400 | 4400 | 4400 | 4400 | 4400 |
| 97.5 | | | 4000 | 3600 | 4000 | 2600 | 3000 | | | 8000+ | 8000+ | 8000+ | 8000+ | 5600 |
| 95 | 1000 | 800 | 4000 | 2000 | 3800 | 3000 | 3600 | 6800 | 8000+ | 8000+ | 8000+ | 8000+ | 8000+ | 6400 |
| 90 | 600 | 1600 | 2200 | 2400 | 2000 | 1800 | 3000 | 4800 | 8000+ | 8000+ | 8000+ | 8000+ | 8000+ | 5600 |
| 80 | 0 | 400 | 800 | 1200 | 800 | 1000 | 2400 | 2800 | 4800 | 5200 | 8000+ | 8000+ | 8000+ | 5600 |
| 70 | 0 | 0 | 0 | 0 | 400 | 600 | 1200 | 1600 | 1600 | 2200 | 2800 | 6600 | 8000+ | 5600 |
| 50 | 0 | 0 | 0 | 0 | 0 | 0 | 0 | 1000 | 800 | 600 | 1600 | 2600 | 3600 | 0 |
| 30 | 0 | 0 | 0 | 0 | 0 | 0 | 0 | 600 | 0 | 0 | 200 | 400 | 1000 | 0 |
| 10 | 0 | 0 | 0 | 0 | 0 | 0 | 0 | 1600 | 0 | 0 | 0 | 0 | 0 | 0 |

EXAMPLE 4

A high calcium hydrated lime slurry consisting of 64 pounds lime and 150 pounds of water was prepared. $SO_2$ was bubbled through the slurry as the slurry was agitated until the system achieved a pH of 8.1. Five portions of the resulting calcium sulfite slurry were blended with varying percentages of dry high calcium hydrated lime in order to achieve dry weight ratios of lime to calcium sulfite of 2:1, 1:1, 1:2, 1:4, and 1:9.

These five lime/sulfite sludges were then mixed with an aquarium. The second set (1 tube of each composition) was cured in a similar manner at 100°F.

After 8 weeks of curing, the specimens were tested for resistance to penetration (determined as resistance in lbs./sq. in. required for the penetration of 1 inch into the specimen by a 0.025 sq. in. rod), with the results tabulated in Table 6. The testing apparatus used for this purpose has an upper limit of 24800 lbs./sq. inch; test specimens stronger than this are (of necessity) listed as having a strength of 24800+ lbs./sq. in.

TABLE 6

Penetration Resistance of High Calcium Hydrated Lime-Sulfite-Fly Ash Compositions

| % Fly Ash In Mix | Hydrated Lime/Sulfite Ratio | | | | | Average |
|---|---|---|---|---|---|---|
| | 2:1 | 1:1 | 1:2 | 1:4 | 1:9 | |
| | Cured for 8 Weeks at 70°F | | | | | |
| 100* | 3800 | 3800 | 3800 | 3800 | 3800 | 3800 |
| 97.5 | 12000 | 12800 | 10400 | 8800 | 7200 | 10240 |
| 95 | 20000 | 16800 | 15200 | 12800 | 7000 | 14360 |
| 90 | 21600 | 24800+ | 24800+ | 18800 | 4800 | 18960+ |
| 80 | 24800+ | 24800+ | 16000 | 20800 | 6800 | 18640+ |
| 70 | 17600 | 16000 | 20000 | 20800 | 4000 | 15680 |
| 50 | 6000 | 10400 | 7200 | 6400 | 3400 | 6680 |
| 30 | 1600 | 3200 | 2800 | 1600 | 1600 | 2160 |
| 10 | 0 | 520 | 0 | 320 | 400 | 250 |
| Average | 11930+ | 12570+ | 11130+ | 10460 | 4330 | 10090+ |
| | Cured for 8 Weeks at 100°F | | | | | |
| 100* | 5200 | 5200 | 5200 | 5200 | 5200 | 5200 |
| 97.5 | 18800 | 16000 | 16000 | 13600 | 9600 | 14800 |
| 95 | 24800+ | 21600 | 20800 | 14800 | 8000 | 18000+ |
| 90 | 24800+ | 24800+ | 24800+ | 24800+ | 9600 | 21760+ |
| 80 | 24800+ | 24800+ | 24800+ | 24800+ | 13800 | 22600+ |
| 70 | 24800+ | 24800+ | 24800+ | 24800+ | 13800 | 22600+ |
| 50 | 16800 | 24800+ | 24800+ | 24800+ | 6000 | 19440+ |
| 30 | 9600 | 10400 | 8800 | 8800 | 1400 | 7800 |
| 10 | 3200 | 4800 | 3200 | 1600 | 1600 | 2880 |
| Average | 16980+ | 17470+ | 17020+ | 15910+ | 7670 | 15010+ |

*Single test specimen used for 100% fly ash mix.

EXAMPLE 5

A calcium sulfite suspension was prepared by bubbling sulfur dioxide through a slurry of high calcium hydrated lime; when the reaction reached completion (complete conversion to calcium sulfite hemi-hydrate) an additional quantity of high calcium hydrated lime was added.

The composition of the resultant sludge was 38 percent calcium sulfite hydrate, 23 percent unreacted calcium hydroxide, and 39 percent water.

This example differs from Example 1 in that the reaction was taken to completion and excess hydrated lime then added. Also, the water content is more similar to that projected for commercial (or pilot) operations. This synthesized sludge parallels that which is being generated by one of the pilot scale boiler gas wet scrubbing systems now in existence.

Penetration resistance specimens were prepared as in previous examples covering a thorough range of fly ash/sludge percentages. Water was added to each composition to achieve a just pourable mortar consistency. Specimens were cured at 70° and 100°F. The following table, Table 7, indicates penetration resistance of these specimens at the time intervals indicated.

below as Series A or Series B, and in each case are made from commercially obtained pulverized high calcium limestone, a typical bituminous fly ash, calcium sulfite from the slurries described in other examples, and finely ground gypsum (calcium sulfate).

The tubes were tested for penetration resistance with the results as shown in the following table. Additionally, after 2 weeks of curing, three of the tubes were taken from the curing aquaria and a glass column 4 feet long was attached to the top of each of the three tubes. Rubber gaskets were used to seal the connection between the glass and stainless steel tubes and the glass columns were filled to the top with water. After 72 hours, the leaching results were as follows:

Composition A 3, cured at 75°F — less than 1 ml.
Composition A 3, cured at 100°F — no leachate.
Composition B 3, cured at 100°F — no leachate.

Test Compositions (dry weight basis):

Series A:

25% pulverized high calcium limestone
25% fly ash
25% calcium sulfite (from slurry)
25% gypsum (calcium sulfate)

TABLE 7

| Composition (% on Dry Basis): | | | | | | | | | |
|---|---|---|---|---|---|---|---|---|---|
| CaSO$_3$·½H$_2$O | 52.7 | 44.1 | 36.5 | 29.8 | 23.6 | 18.0 | 12.9 | 8.2 | 4.0 |
| Ca(OH)$_2$ | 31.9 | 26.7 | 22.7 | 18.0 | 14.3 | 10.9 | 7.8 | 5.1 | 2.4 |
| Fly Ash | 15.4 | 29.2 | 41.3 | 52.2 | 62.1 | 71.1 | 79.3 | 86.7 | 93.6 |
| Penetration Resistance (PSI): | | | | | | | | | |
| 70°F | | | | | | | | | |
| 1 Week | 0 | 0 | 0 | 0 | 0 | 0 | 0 | 800 | 1000 |
| 2 Week | 0 | 0 | 0 | 0 | 0 | 600 | 1000 | 4000 | 4800 |
| 4 Week | 0 | 0 | 800 | 1400 | 2400 | 4800 | 7200 | 8000+ | 8000+ |
| 8 Week | 0 | 1200 | 2800 | 6400 | 8000+ | 8000+ | 8000+ | 8000+ | 8000+ |
| 16 Week | 600 | 3600 | 8000+ | 8000+ | 8000+ | 8000+ | 8000+ | 8000+ | 8000+ |
| 100°F | | | | | | | | | |
| 1 Week | 0 | 0 | 0 | 0 | 400 | 1000 | 1200 | 4200 | 4400 |
| 2 Week | 0 | 400 | 800 | 2000 | 3400 | 5600 | 8000 | 8000+ | 8000+ |
| 4 Week | 600 | 2000 | 4400 | 8000+ | 8000+ | 8000+ | 8000+ | 8000+ | 8000+ |
| 8 Week | 1600 | 6400 | 8000+ | 8000+ | 8000+ | 8000+ | 8000+ | 8000+ | 8000+ |
| 16 Week | 3600 | 8000+ | 8000+ | 8000+ | 8000+ | 8000+ | 8000+ | 8000+ | 8000+ |

EXAMPLE 6

Stainless steel tubes were set up (as outlined in previous examples) in order to test the penetration resistance and leachability of several lime-sulfite-fly ash compositions. The compositions used are designated Series B:

20% pulverized high calcium limestone
40% fly ash
20% calcium sulfite (from slurry)
20% gypsum (calcium sulfate)

| Test Designation | Composition Dry Wgt. % Added Lime | % Solids | % Flow | Final Penetration Resistance (psi) 75°F Cure | | 100°F Cure | |
|---|---|---|---|---|---|---|---|
| | | | | 1 Week | 2 Weeks | 1 Week | 2 Weeks |
| A 1 | 0 | 80.0 | 112 | 0 | 0 | 0 | 0 |
| A 2 | 2.5 | 80.3 | 106 | 220 | 3000 | 1000 | 6400 |
| A 3 | 5.0 | 80.7 | 98 | 300 | 3400* | 1200 | 7000* |
| B 1 | 0 | 81.3 | 106 | 240 | 600 | 600 | 1000 |
| B 2 | 2.5 | 81.7 | 99 | 600 | 5200 | 2400 | 12800 |
| B 3 | 5.0 | 82.0 | 80 | 400 | 4000 | 1800 | 11200* |

*tubes used for leaching tests

From the foregoing test data and examples, it is apparent that sulfite sludges, such as those produced in the wet scrubbing of combustion equipment stack gases, may be used, in accordance with the present invention, as an ingredient in highly useful cementitious mixtures. Further, cementitious compositions including such sludges have been demonstrated to be at least comparable and in some cases better in physical characteristics as compared to other lime-fly ash cementitious mixtures. With respect specifically to sulfite sludges, at present it is believed that the influence of the sulfite ion on the equilibrium of the solubility products of the mixture is primarily responsible for the reaction proceeding at a more accelerated rate. Hence, while the sulfite may not directly enter into the reaction, it does enhance the pozzolonic and sulfopozzolonic curing reactions of conventional lime-fly ash cement. Chemically, the sulfite-containing cementitious mixtures of the present invention are not thought to be analogous to lime-fly ash-sulfate cementitious mixtures. In the latter type of mixture, a crystalline reaction product, namely ettringite, is discernible. In the lime-fly ash-sulfite cementitious mixtures of the present invention, no crystalline reaction product has yet been found. There appears therefore to be no necessary interrelationship between the chemical involvement of the sulfate and sulfite ions in lime-fly ash mixtures although reactions involving each of these ions may proceed together. The facts that sulfite sludges in some cases contain sulfate ions and that sulfite ions are in some cases oxidized to sulfate ions do not in any way impair the usefulness of the composition of the present invention since cementitious mixtures containing practically any proportion of sulfite and sulfate ions, together with appropriate proportions of alkaline earth metal ions and fly ash, may be used in all of the applications discussed above.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. The cementitious hardenable, structural mixture comprising a water suspension of 30 – 90 weight percent solids, said solids comprising 0.25 – 70 weight percent alkaline earth metal hydroxides, 10 – 99.5 weight percent fly ash and 0.25 – 70 weight percent alkaline earth metal sulfite.

2. The cementitious mixture of claim 1, wherein said solids content is 30 – 60 weight percent of said suspension.

3. The cementitious mixture of claim 1, wherein said solids content is 50 – 90 weight percent of said suspension.

4. The cementitious mixture of claim 1, wherein said alkaline earth metal hydroxides consist essentially of calcium hydroxide.

5. The cementitious mixture of claim 1, wherein said alkaline earth metal hydroxides consist essentially of calcium hydroxide and said alkaline earth metal sulfite consists essentially of calcium sulfite.

6. Hardenable material consisting of the cementitious mixture of claim 1 admixed with aggregate.

* * * * *

UNITED STATES PATENT OFFICE
CERTIFICATE OF CORRECTION

Patent No. 3,785,840        Dated January 15, 1974

Inventor(s) Leonard John Minnick, William C. Webster, Charles L. Smith

It is certified that error appears in the above-identified patent and that said Letters Patent are hereby corrected as shown below:

Col. 1, line 50, change "these" to ---three---.

Col. 2, line 52, change "surfates" to ---sulfates---.

Col. 10, Table 6, four lines below the sub-title "Cured for 8 Weeks at 100°F" delete as follows:

column 1, which is "% Fly Ash in Mix" delete "90 24800+" and substitute therefor ---90---.

column 5, which is "1:4" delete "9600" and substitute therefor ---248000+---.

column 6, which is "1:9" delete "21760+" and substitute therefor ---9600---.

column 6, which is blank; please enter ---21760+---.

Col. 11, 12, in Example 6, in the table at the bottom of the page, delete the word "Final" which appears above the words "Penetration Resistance (psi)" and insert the word "Final" above the word "Composition".

Signed and sealed this 29th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,785,840     Dated January 15, 1974

Inventor(s) Leonard John Minnick, William C. Webster and Charles L. Smith

It is certified that error appears in the above-identified patent and that said Letters Patent are hereby corrected as shown below:

In the Patent:

Column 8, line 69, delete "C-230";

Column 10, line 3, delete "standard"; and

Column 10, line 4, delete "C-230".

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*